United States Patent [19]

Yang et al.

[11] Patent Number: 5,315,597
[45] Date of Patent: May 24, 1994

[54] METHOD AND MEANS FOR AUTOMATICALLY DETECTING AND CORRECTING A POLARITY ERROR IN TWISTED-PAIR MEDIA

[75] Inventors: Henry S. Yang, Andover, Mass.; William C. Mallard, Jr., Nashua, N.H.

[73] Assignee: Digital Equipment Corporation, Maynard, Mass.

[21] Appl. No.: 880,455

[22] Filed: May 8, 1992

[51] Int. Cl.5 ............................................. H04L 12/40
[52] U.S. Cl. ................................... 371/20.1; 371/20.4; 371/65
[58] Field of Search ................... 371/20.1, 20.2, 20.4, 371/55, 57.1, 65; 370/85.1, 85.3, 85.15; 340/533, 534, 658

[56] References Cited

U.S. PATENT DOCUMENTS 5,107,489 5/1992 Brown et al. ...................... 370/58.2
5,249,183 9/1993 Wong et al. ........................ 370/85.3

FOREIGN PATENT DOCUMENTS 0164249 12/1985 European Pat. Off. ...... H04L 11/16
0442619 8/1991 European Pat. Off. ....... H03K 5/02

Primary Examiner—Vincent P. Canney
Attorney, Agent, or Firm—Cesari and McKenna

[57] ABSTRACT

A circuit for incorporation into LAN-compatible devices uses both the link integrity test (LIT) pulses and the end of frame delimiter (EOF) waveform information in received data transmissions to detect polarity errors on the twisted-pair media to which the devices are connected. The circuit integrates this information and a new auto-polarity detection/correction algorithm with the LIT algorithm of the IEEE 10 Base T standard to provide a stable and reliable twisted-pair link operation. Also, once the circuit is in its normal operational stage, it will not declare that a link is faulty unless it fails to receive a LIT pulse or an EOF waveform within a time-out period that is in accord with the IEEE standard. Therefore, the circuit is quite insensitive to line noise.

56 Claims, 4 Drawing Sheets

METHOD AND MEANS FOR AUTOMATICALLY DETECTING AND CORRECTING A POLARLITY ERROR IN TWISTED-PAIR MEDIA

This invention relates to the testing of the link integrity of twisted-wire pair media in a local area network (LAN). It relates more particularly to a circuit for incorporation into work stations and other LAN-compatible devices for enabling those devices to automatically detect a polarity error in the medium wiring to which they are connected and adapt them to the wiring polarity.

BACKGROUND OF INVENTION

A local area network (LAN), such as an Ethernet network, allows the exchange of data among computers, workstations and other such data terminal equipment (DTE). The DTEs are linked to one another either directly or via repeater units for office automation, distributed processing and other applications requiring exchange of information.

In a typical network, at least some of the network link segments consist of two twisted-wire pairs. Each pair consists of two continuous insulated conductors twisted helically about one another. The ends of the twisted pair are coupled to a DTE or repeater unit by way of a medium attachment unit (MAU) which provides the means by which the signals to and from the DTE or repeater unit are coupled to and from the twisted pairs.

The Ethernet LAN uses the Manchester signal encoding scheme defined in the IEEE 802.3 CSMA/CD 10 Base T standard. With this type of binary-to-phase encoding, there is a phase transition in every bit cell center. A logical one is a transition from low to high; a logical zero is a transition from high to low. The transition every bit allows clocking to be combined with data transmission and allows the carrier to be detected by the presence of transitions on the twisted pair media.

In the Ethernet LAN the encoding-decoding function is carried out by a controller board in each DTE or repeater unit on the network. The same board is responsible for data encapsulation and decapsulation according to the 10 Base T standard. In particular, when a packet of data is to be transmitted from the DTE over the network, the controller formats it as a frame with a preamble, a starting delimiter, address fields, a data field and an end-of-frame delimiter (EOF) waveform, necessary for transmission in accordance with the network protocol. The MAU contains the logic required to send this frame over the twisted pair after determining the availability of the link. Conversely, when the MAU receives a transmission over the twisted pair, it couples the encoded data to the encoder/decoder of the DTE. That unit checks the incoming frame to verify that it should be accepted, strips off the frame preamble and the delimiters and passes the address and data fields to the DTE.

In addition to providing the transmit and receive functions just described, the MAU provides other functions specified in the above standard, namely collision detection, loopback, jabber, and link integrity test (LIT) functions. Of these, the LIT function is of relevance to the present invention, so we will amplify upon it at this point.

In order to protect the network from the consequences of a media failure or an installation error of the twisted pair wire, each MAU includes a LIT pulse generator which emits a positive-going LIT pulse periodically for transmission over the associated link segment when that MAU is not transmitting a frame. Each MAU also monitors the associated link segment for frame data and LIT pulses from the MAUs.

While the MAU is in its so-called LIT Fail State, its normal communication functions, e.g., transmit, receive, loopback, are disabled and it looks continually for a frame or for a pre-defined sequence of LIT pulses and/or receive frames in order to enter the LIT Pass State in which it is enabled to perform the normal data transfer functions. More particularly, when frame information or a selected number, LC Max=2-10, of consecutive LIT pulses is received, the MAU enters the LIT Pass State. The standard also specifies that only LIT pulses that occur between a time, LIT Max=25-150 ms, of each other will be considered consecutive and countable.

In addition, while the MAU is in the LIT Pass State, detected LIT pulses that occur within a time, LIT Min=2-7 ms, of a previous frame or LIT pulse are ignored. In the LIT Fail State, such pulses reset the counted number of consecutive LIT pulses to 0.

When the MAU is in the LIT Pass State, it operates to provide the normal communication services between the twisted-pair media and associated DTE or repeater unit.

If, while the MAU is in the LIT Pass State, the MAU receives neither frame data nor a LIT pulse for a defined time, LINK-loss=50-150 ms, the MAU enters the LIT Fail State and disables the MAU's normal communication functions.

Further in accordance with the above IEEE standard, each Manchester-encoded signal transmitted and received via the twisted pair media is a differential-mode voltage which constitutes the algebraic difference between the two signals on the twisted pair, with both signals being referred to a common reference. In order for the differential signaling arrangement to work properly, the drivers and receivers of the MAUs must agree about the polarity of the conductors in the twisted pair, i.e., the positive and negative inputs to the receiving MAU must agree with the positive and negative outputs from the transmitting MAU. If there is a polarity difference due, for example, to a twisted pair wire installation error, the link cannot establish proper communication between the devices at the opposite ends of the link.

It should be understood also that the above standard assumes that the twisted pair polarity for each network link is correct, i.e., it does not require detection or correction of wiring polarity errors.

Actually, wire installation errors are quite common because when a LAN is installed in a building or office complex, the people who install the physical medium or wires are usually not the same people who install the DTE or repeater units and/or the wires and those devices are installed at different times. Consequently, wiring polarity errors are typically not discovered until after the devices have been installed and tested. Needless to say, correction of such wiring errors in a large network installation can be a tedious and time consuming task.

Some devices do incorporate means which allow detection and correction of twisted pair polarity errors. Typically, a chip is incorporated into the equipment which allows detection of the polarity of the twisted pair based on the polarity of a received LIT pulse. Depending on the polarity of that received pulse, the MAU receiver input polarity is selected accordingly.

However, the prior polarity detection/selection scheme is quite sensitive to electrical disturbances or line noise which may result from cross-talk or from noise impulses caused by telephone operations on telephone wires bundled in close proximity to the network twisted pair bundles. Whatever the cause, such noise can produce unwanted switching of the receiver polarity, resulting in undesirable switching errors and packet frame loss. Even if the equipment is correctly wired to the twisted pairs at the outset, such noise can cause the equipment to falsely switch polarity, resulting in errors.

SUMMARY OF THE INVENTION

Accordingly, the present invention aims to provide a circuit for incorporation into LAN-compatible devices such as DTEs and repeater units to enable those devices to automatically detect polarity errors in the twisted pair media associated with the devices and to adapt themselves to the wiring polarity.

Another object of the invention is to provide a circuit such as this which is not prone to polarity detection and switching errors due to electrical disturbances or noise.

Still another object of the invention is to provide a circuit of this type which can be implemented in existing LAN-compatible devices.

A further object of the invention is to provide a method of enabling LAN-compatible devices to automatically detect and correct for polarity errors in twisted pair media.

Other objects will, in part, be obvious and will, in part, appear hereinafter.

The invention accordingly comprises the several steps and the relation of one or more such steps with respect to each of the others, and the apparatus embodying the features of construction, combination of elements and arrangement of parts which will be exemplified in the following detail description, and the scope of the invention will be indicated in the claims.

Briefly, the present invention provides a circuit for incorporation into LAN-compatible devices such as DTEs and repeater units which uses both the LIT pulses and the EOF waveform information in incoming signals to detect polarity errors on the twisted pair media to which the devices are connected. Furthermore, the circuit integrates this information and a new auto-polarity detection/correction algorithm with the LIT algorithm of the 10 Base T standard to provide a more stable and reliable twisted-pair link operation.

Conceptually, the circuit has three stages of operation. In the first stage, it tests the polarity of received LIT pulses and the polarity of received EOF waveforms. In the second stage, after a LIT pulse or an EOF waveform is received, the circuit uses the detected signals both to perform a link integrity test and to verify the detected polarity. More particularly, it tests for a pre-defined number of LIT pulses with the correct polarity. It also tests for a pre-defined number of frames whose EOF waveforms have the correct polarity. While in this second stage, if a LIT pulse or EOF waveform of opposite polarity is received, then the signal being fed to the DTE's MAU circuits is inverted thereby effectively reversing the wiring polarity and the entire test is then repeated. During the first and second stages, the MAU is disabled from performing its normal communication functions.

Once the circuit has received signals which pass either one of the above test criteria, it assumes that the polarity verification is successful and enters the third stage of operation wherein the MAU's normal operation is enabled, using the detected polarity. While in the third stage, the circuit expects to receive a LIT pulse or an EOF waveform with the correct polarity within a pre-defined time window which is designed to substantially coincide with that of the link integrity test in the aforementioned IEEE standard. If it fails to do so, the circuit then disables the normal operation of the MAU and returns to stage one to repeat the link integrity test and polarity detection function described above.

The polarity detection/correction technique disclosed here has two key advantages over the other known method described at the outset. First, the polarity test is integrated with the link integrity test in the IEEE standard, providing a very robust and rigorous test to verify the detected polarity and the integrity of the link. As a result, link operation is more deterministic and reliable. Secondly, once the circuit is in its normal operational stage, i.e., stage three above, it will not declare that a link is bad unless it fails to receive a LIT pulse or an EOF waveform within a pre-determined time-out period that is in accord with the standard link integrity test. Therefore, the circuit is quite insensitive to line noise.

The circuit is advantaged also because it can be implemented, or even retro-fitted, as a semi-conductor chip or CAD cell in any LAN-compatible device that is in accord with the IEEE 802.3 10 Base T standard, including DTEs, repeater units, adapters, bridges, routers, and systems with imbedded Ethernet 10 Base T connections.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figures 1, 2:
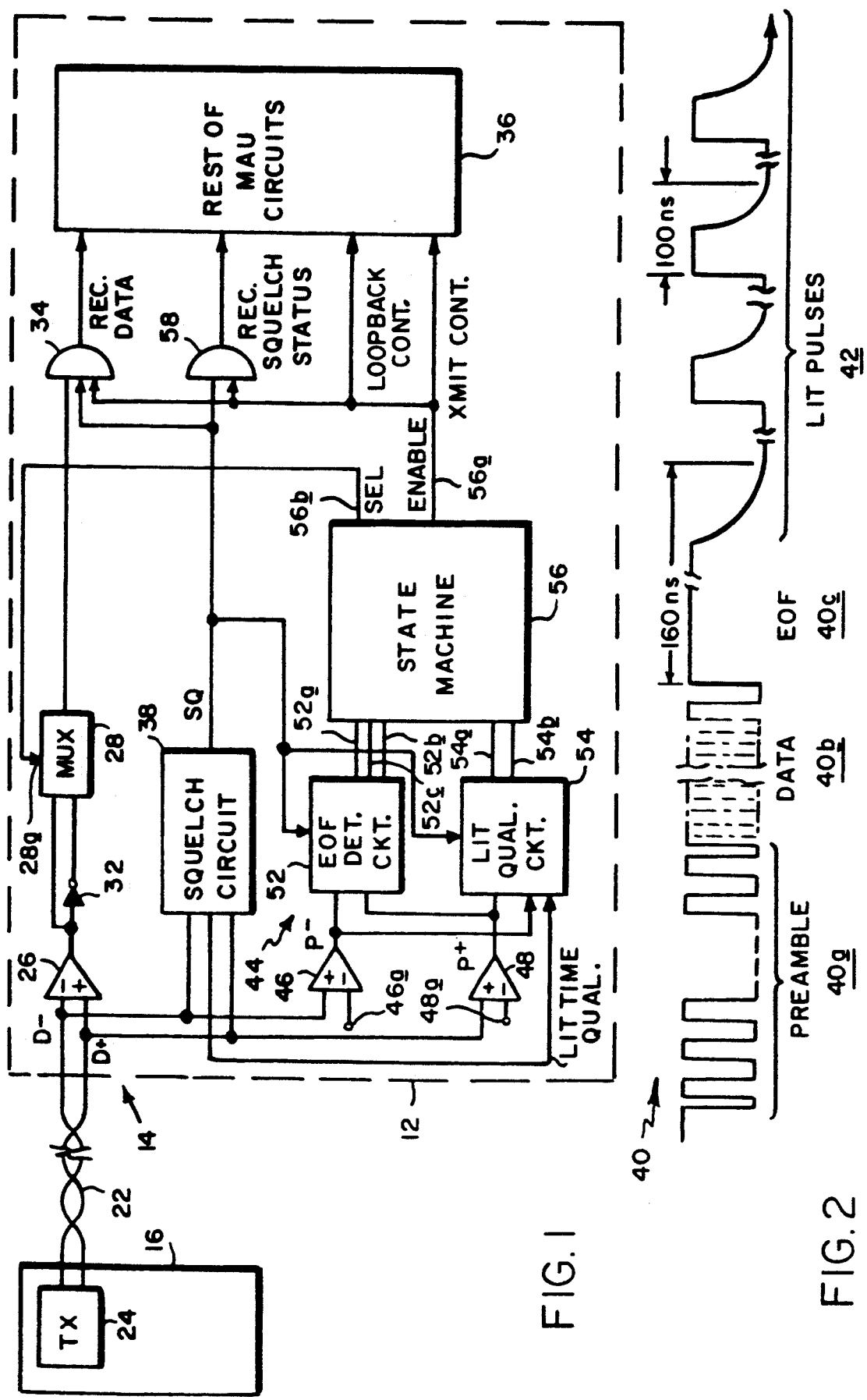
FIG. 1 is a block diagram of a twisted pair LAN link including a workstation incorporating a link integrity test and wiring polarity detection/correction circuit according to the invention.
FIG. 2 is a diagram of a representative data stream comprising the signal input to the workstation in FIG. 1.

Referring now to the drawings, FIG. 1 illustrates the receiver section of a medium attachment unit (MAU) of a LAN device such as a workstation 12. Workstation 12 is linked in a LAN 14 to another LAN device such as a repeater 16 by twisted pair media. The repeater includes a transmitter or driver 24 which supplies data via a twisted pair 22 to an operational amplifier 26 in the workstation 12. Repeater 16 may also receive data from the workstation 12 by way of a second twisted pair (not shown). The workstation 12 is thus able to communicate with other devices in LAN 14 via repeater 16.

The signals from amplifier 26 are applied directly to one port of a multiplexer 28, the other port of which receives the same signal by way of an inverter 32. The multiplexer selects between its two inputs in response to a SELECT (SEL) signal applied to its control terminal 28a. By switching inputs, the multiplexer effectively reverses the polarity of the signal at its output, which is coupled to an AND gate 34. When that gate is enabled by the coincidence of two other inputs to be described presently, the received data is passed to the rest of the MAU circuits 36 of the workstation 12.

As described above, the signals transmitted over the twisted pair 22 to the workstation 12 include frame information, each frame beginning with a defined preamble and ending with a prescribed end of frame delimiter (EOF) waveform. When repeater 16 is not sending frame information, it transmits LIT pulses periodically which are processed by workstation 12 to verify the integrity of the twisted pair link.

FIG. 2 shows a timing diagram for a frame 40 of Ethernet data followed by a series of LIT pulses 42 that might be received by workstation 12. The frame preamble is indicated at 40a, the data at 40b and the EOF waveform is shown at 40c. As seen there, the back edges of the LIT pulses and EOF waveform are not quick logic transitions. Rather, the pulses and waveform decay expotentially within specified bounded times.

One of the enabling signals to gate 34 derives from a so-called squelch circuit 38. This circuit, which is described in detail in U.S. Pat. No. 4,003,556, receives the incoming stream of data and distinguishes between noise and valid frame data transmitted within LAN 14. It does this by detecting a defined sequence of positive and negative pulses quantified in time within the packet preamble 40a. If the squelch circuit is satisfied that the incoming packet frame preamble is correct, it issues an SQ signal (SQ=ON) to gate 34 and to other elements of the workstation to be described. The SQ signal becomes de-asserted (SQ=OFF) about 200 ns after the last positive transition of a data packet. Thus, gate 34 only passes frame information; it does not pass LIT pulses.

The incoming signal on the twisted pair 22 is also applied to a link integrity test and polarity detection/correction circuit shown generally at 44. Circuit 44 includes a first comparator 46 which receives at its non-inverting input the signal on one conductor D of the twisted pair 22. The signal on the other conductor D+ of the pair is applied to the non-inverting input of a second comparator 48 in circuit 44. Selected receiver threshold voltages are applied to the inverting inputs 46a and 48a of the two comparators. Resultantly, when the magnitude of a signal pulse on conductor D− is greater than the threshold voltage at terminal 46a, a signal P− will be asserted at the output of comparator 46. Similarly, when the magnitude of a signal pulse on conductor D+ is applied to comparator 48 which exceeds the threshold voltage at terminal 48a, a signal P+ is asserted at the output of comparator 48. The thresholds, which may be the same, are selected so that the comparators 46 and 48 respond to the voltage magnitudes of the IEEE standard.

The outputs of comparators 46 and 48 are applied to an EOF detector circuit 52 and also to a LIT pulse qualification circuit 54. Circuit 52 is able to distinguish the EOF waveform 40c in FIG. 2 from other incoming waveforms on the twisted pair 22 because of the characteristic long duration of that waveform, e.g., 160 ns. Circuit 52 has three output lines, 52a, 52b and 52c, all of which lead to indicating means in the form of a state machine 56. When circuit 52 detects an EOF with a positive polarity (EOF+), it emits a signal on line 52a. If it detects an EOF with a negative polarity (EOF−), it delivers a signal on line 52b. Line 52c carries a delayed EOF STROBE signal to activate further operations of the downstream circuitry in state machine 56.

The LIT pulse qualification circuit 54 is able to distinguish LIT pulses 42 in FIG. 2 arriving on twisted pair 22 from noise by detecting the characteristic duration of those pulses, e.g., 100 ns. The incoming pulses are further qualified to be within the time acceptance window of the IEEE 10 Base T specification. The known squelch circuit 38 (FIG. 1) also performs this function and issues a LIT TIME QUAL signal to circuit 54. When it is determined that a valid LIT pulse of positive polarity has been received, circuit 54 delivers a LIT+ signal over a line 54a to state machine 56. On the other hand, when a valid LIT pulse with a negative polarity is detected, a LIT− signal is delivered over a line 54b to state machine 56.

Circuits 52 and 54 also receive the SQ signal from the squelch circuit 38 for reasons that will become apparent later.

Once an EOF or a LIT pulse of a particular assumed polarity is received and detected, the state machine 56 uses the detected polarity to perform a link integrity test and to verify the detected polarity. The criteria to pass the test and polarity verification are the reception of two EOF waveforms of the same polarity, or 8 LIT pulses with the same polarity. Once the state machine 56 verifies one of the pass criteria, it assumes that the link integrity test has passed and that the polarity verification is successful and, in response, issues an ENABLE signal on an output line 56a.

The ENABLE signal on line 56a is applied as the second enabling input to gate 34. When the outputs of the squelch circuit 38 and the state machine 56 are asserted simultaneously, this indicates that the polarity of the twisted pair at workstation 12 is correct and that valid data frame is being received by the workstation 12. The presence of those signals enables gate 34 so that the signal from amplifier 26 is passed to the remainder of the workstation's MAU circuits 36. The ENABLE signal from state machine 56 is also applied directly to circuits 36 as a control signal to enable the transmit and loopback functions of those circuits. In addition, it is coupled to an AND gate 58 which also receives the output SQ from squelch circuit 38. When the ENABLE and SQ signals are both asserted, i.e., SQ=ON, gate 58 applies a signal to MAU circuits 36, indicating the receiver squelch status. Resultantly, the MAU circuits 36 function normally and workstation 12 processes the incoming data.

During the aforesaid link integrity test and polarity verification, if an EOF waveform with the opposite polarity to the assumed polarity or a LIT pulse with the opposite polarity to the assumed polarity is sensed by the link integrity test-polarity detection/correction circuit 44, then the state machine 56 issues a SEL signal on a line 56b which is applied to multiplexer control terminal 28a causing the multiplexer to switch to its other input channel, thereby effectively reversing the polarity of the signal coupled, via gate 34, to the MAU circuits 36. As far as those circuits 36 are concerned, this has the same effect as reversing the twisted pair connection to the workstation 12.

The state machine 56 also aborts the current link integrity test/polarity verification routine and begins a new routine using the new, i.e., opposite, polarity detected by circuit 44.

As described at the outset, the IEEE standard link integrity test requires that a LIT pulse be received within a specified timing window from the previous LIT pulse. The present invention follows that standard in that a LIT pulse must be received after 2-7 ms (2 ms preferred) and within 25-150 ms (150 ms preferred) of the previous LIT pulse in order to be considered. If that timing window is violated, the number of lit pulses received up to that point in the test is reset to zero.

Once the state machine 56 does determine that a pass criterion of the integrity test has been met and asserts an ENABLE signal on line 56a to enable the MAU circuits 36 as described above, it expects to receive an EOF waveform with the correct polarity or a LIT pulse with the correct polarity within a pre-selected timeout period LINK-Loss=50-150 ms (100 ms preferred), which is consistent with the IEEE link integrity test standard described above. If that does not occur, the state machine determines that the link integrity and detected polarity have failed. It then de-asserts the ENABLE signal on output line 56a thereby disabling the functions of MAU circuits 36. It also reinstitutes the link integrity test and polarity detection/correction procedure just described and waits for more incoming EOF waveforms and LIT pulses.

Figure 3:
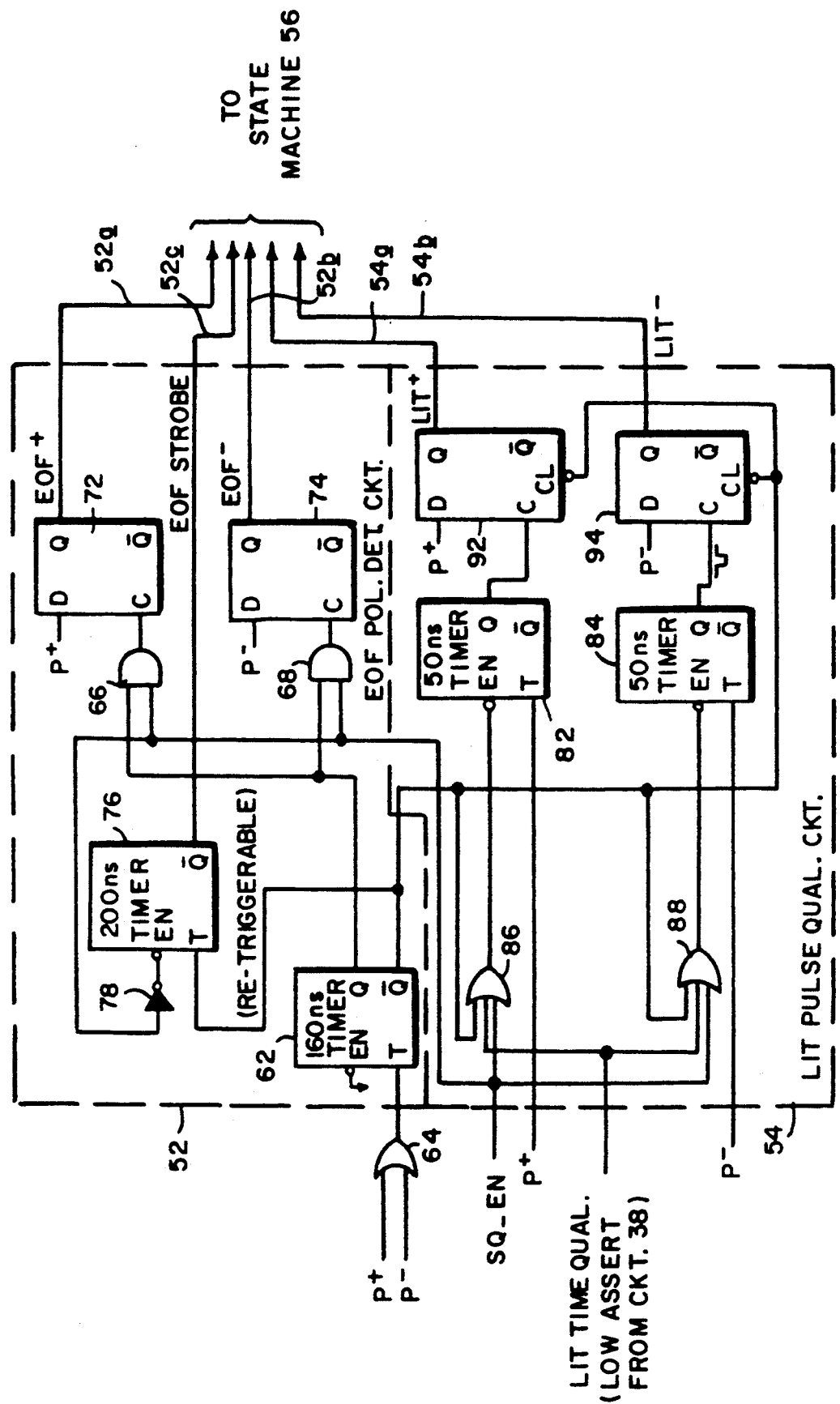
FIG. 3 is a block diagram showing a portion of the FIG. 1 circuit in greater detail.

Referring now to FIG. 3 of the drawings, the EOF polarity detection circuit 52 comprises a 160 ns timer 62 whose trigger input (T) receives, by way of an OR circuit 64, both the P$^-$ and P$^+$ outputs from comparators 46 and 48, respectively. The enable terminal (EN) of timer 62 is grounded so that the timer is repeatedly cleared by P$^+$ or P$^-$ transitions spaced closer than 160 ns. When the timer is cleared, the Q output of the timer is low while the $\overline{Q}$ output of the timer remains asserted. However, when the transitions stop for that period, which is indicative of an EOF waveform, the Q output of the timer is asserted.

The Q output of timer 62 is applied to a pair of AND circuits 66 and 68 in circuit 52. The other input to circuits 66 and 68 is the SQ signal from squelch circuit 38 in FIG. 1. The outputs of these AND circuits are fed to the clock inputs (C) of flip-flops 72 and 74, respectively. Flip-flop 72 also receives at its data input D, the P$^+$ signal from comparator 48 in FIG. 1; the corresponding input of flip flop 54 receives the P$^-$ signal from comparator 46.

If the P$^+$ signal is present at flip flop 72 when that flip-flop is clocked, that signal is latched at the Q output of the flip-flop, indicating that an end of frame waveform with a positive polarity (EOF$^+$) has been detected. Likewise if a P$^-$ signal is present at flip-flop 74 when that flip-flop is clocked, then that signal will cause assertion of the Q output of flip-flop 74, indicating that an end of frame waveform with a negative polarity (EOF$^-$) has been detected.

The $\overline{Q}$ output of the timer 62 is coupled to the trigger input (T) of a 200 ns timer 76 in circuit 52. This timer is enabled by the SQ signal from circuit 38 in FIG. 1, which is applied to the timer's enable input EN by way of an inverter 78. Thus, since the timer is enabled by a "low" level, it does not actuate unless the SQ signal is asserted prior to assertion of the trigger input T after timer 62 times out. When timer 76 does time out after 200 ns, the timer's $\overline{Q}$ output is asserted, providing an EOF STROBE signal to state machine 56. The purpose of the signal is to provide a qualifying pulse for the circuits in state machine 56. This pulse provides an indication to the state machine that a new EOF waveform polarity has been detected, has been latched by flip-flop 72 and the status of which is now stable for circuit 56 to examine.

Thus, circuit 52 provides no EOF signals to the state machine 56 unless the SQ signal is present when timer 62 times out, indicating that valid frame information is being received by the workstation 12 (FIG. 1). When that condition does exits, and timer 62 times out, indicating that an EOF waveform has been detected, circuit 52 will provide an EOF$^+$ signal or an EOF$^-$ signal to state machine 56, depending upon whether a P$^+$ or a P$^-$ signal is present at circuit 52.

Still referring to FIG. 3, the LIT pulse qualification circuit 54 comprises a pair of 50 ns timers 82 and 84. Timer 82 receives the P$^+$ voltage from comparator 48 at its trigger input (T), while timer 84 receives the P$^-$ signal from comparator 46 at its trigger input (T). The enable inputs (EN) of timers 82 and 84 receive the outputs from OR circuits 86 and 88, respectively. Both of those circuits receive the $\overline{Q}$ output from timer 62 in circuit 52 and the SQ signal and LIT TIME QUAL signal from circuit 38 (FIG. 1). Timers 82 and 84 are enabled when the signals applied to their inputs EN are asserted low, i.e., when all of the inputs to OR circuits 86 and 88 are low. Therefore, the timers are disabled so long as the SQ signal is asserted, indicating that valid frame information is being received by the workstation. The SQ signal is de-asserted after the EOF waveform passes. Also, the timers will remain disabled so long as the $\overline{Q}$ output of timer 62 is high, indicating that an EOF waveform has not been detected. In other words, as long as the circuit 52 is performing its EOF polarity detection function, the timers 82 and 84 in circuit 54 are disabled. Furthermore, timers 82 and 84 will not be enabled unless the LIT TIME QUAL signal from circuit 38 is asserted low, indicating that the LIT pulses fall within the time window specified by the IEEE 10 Base T specification.

When enabled timer 82 is cleared each time there is a positive-going transition of the P$^+$ signal at its trigger terminal (T). When there are no such transitions at that terminal for a period of 50 ns, representing half the duration of a LIT pulse 42 in FIG. 2, timer 82 times out and the Q output is asserted and applied to the clock input (C) of a flip-flop 92. That flip-flop also receives at its data input (D), the P$^+$ voltage from comparator 48 (FIG. 1). Thus, when timer 82 times out, that P$^+$ signal is latched as a LIT$^+$ signal at the Q output of flip-flop 92, indicating that a LIT pulse with a positive polarity has been detected.

Similarly, timer 84 is reset by transitions of the P$^-$ signal from comparator 46 (FIG. 1). When there is no signal transition at the trigger terminal T of that timer for 50 ns, the Q output of that timer is asserted and applied to the clock input (C) of a flip-flop 94 which also receives the P$^-$ voltage at its data input (D). Thus, when a P$^-$ signal is present and timer 84 times out, a LIT$^-$ signal is latched at the Q output of flip flop 94, indicating that a LIT pulse with a negative polarity has been received. Both the LIT$^+$ and LIT$^-$ signals are coupled to state machine 56.

The various outputs from circuits 52 and 54 applied to state machine 56 are used to carry out an autopolarity detection/correction program in conjunction with a standard link integrity test. In other words, the state machine 56 integrates applicants' invention into the standard link integrity test function as described in the IEEE 802.3 standard.

Figure 4:
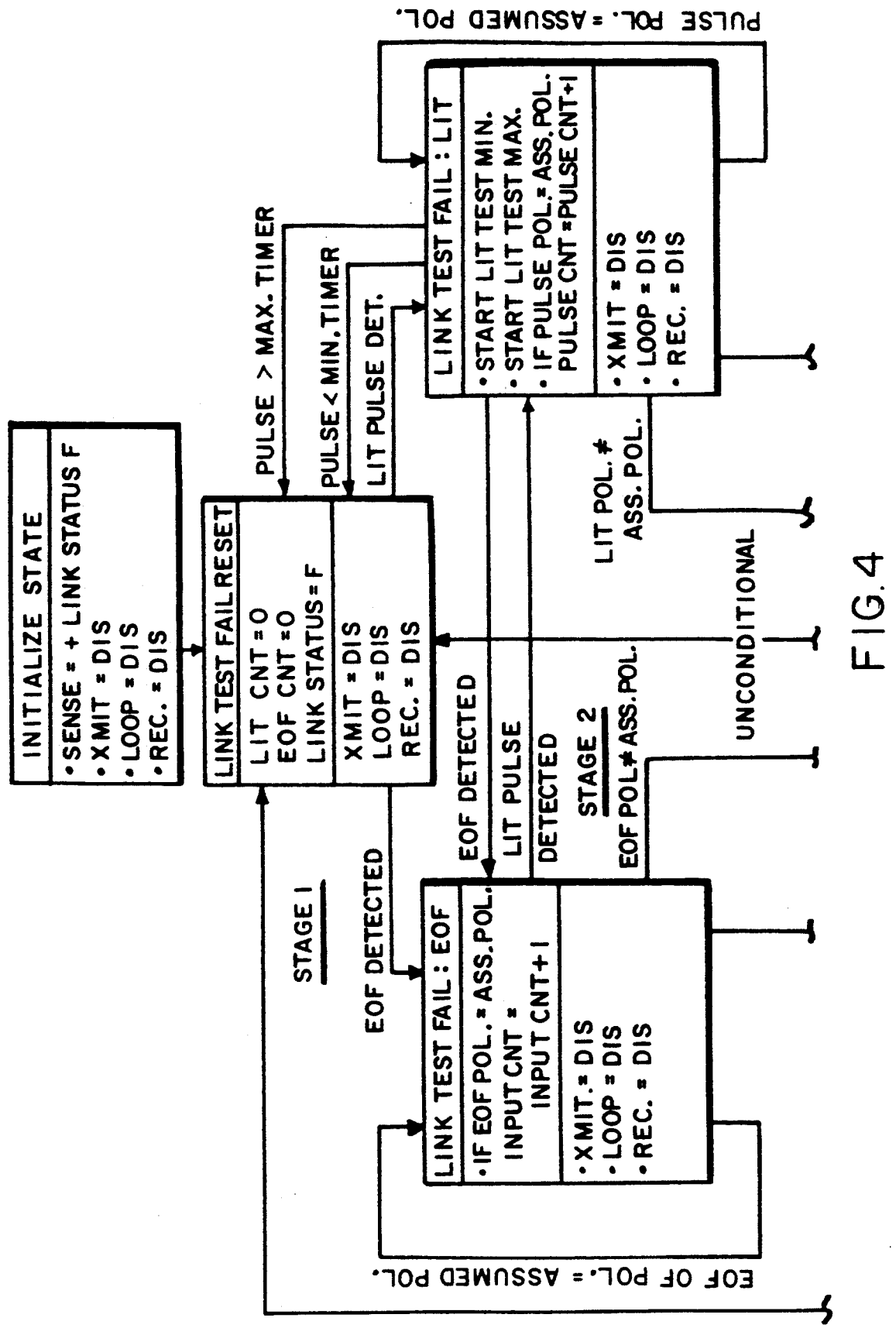
FIG. 4 is a state diagram showing the link integrity test and automatic polarity detection/correction routine performed by the state machine in the FIG. 1 circuit.
Figure 4:
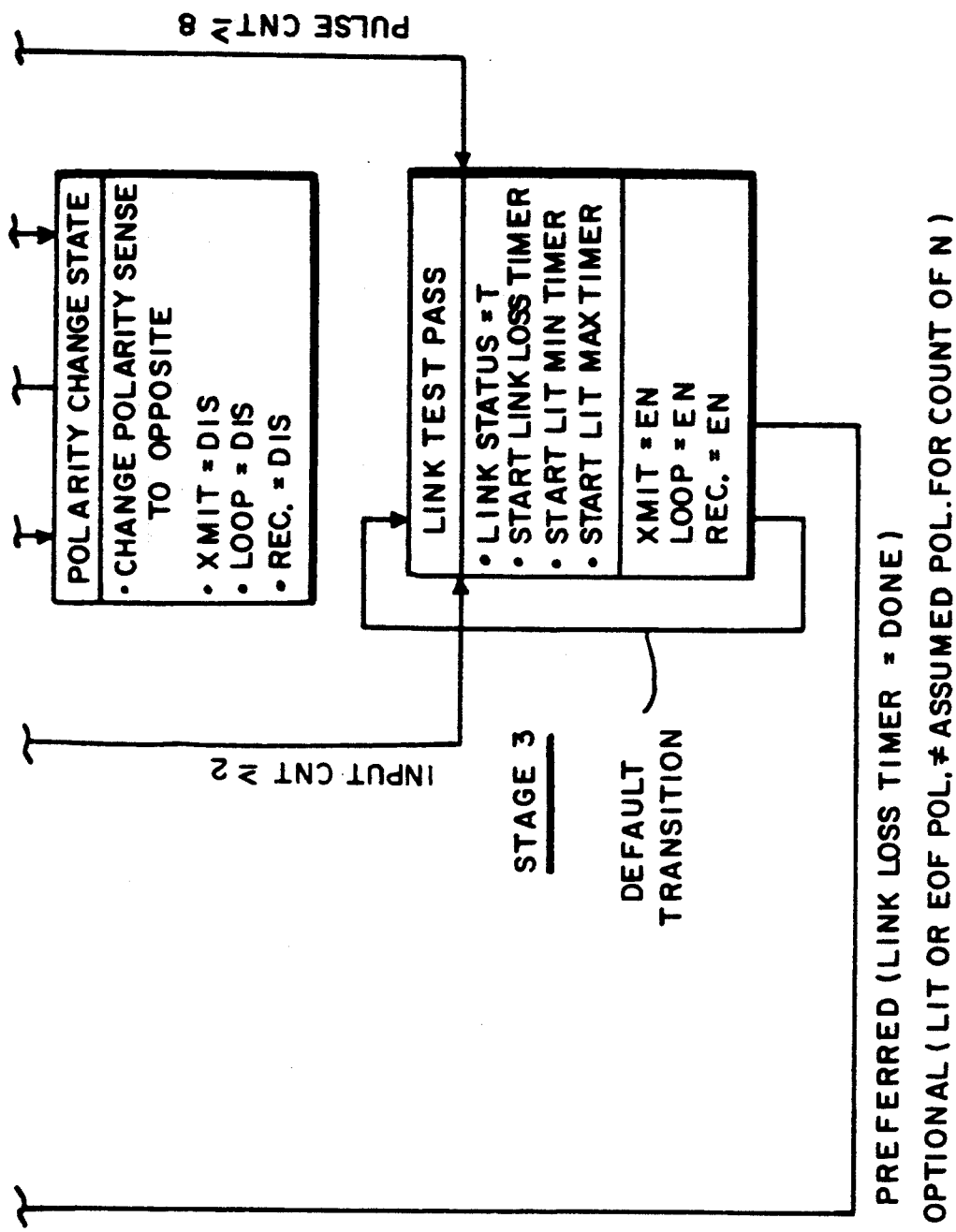

Refer now to FIG. 4, which is a state diagram showing the link integrity test polarity detection/correction routine carried out by state machine 56. It closely parallels the similar diagram shown in FIG. 14-6 of the IEEE 802.3 standard referred to above. It may be implemented in hardware or software in the same manner as is the standard link integrity test by those skilled in the art.

At power on, the state machine 56 adopts an initial state wherein the ENABLE signal on line 56a of state machine 56 is not asserted so that the MAU circuit's transmit, receive and loopback functions are disabled and the status of the link is Fail (F). Also, the state machine defaults to an assumed polarity so that the SEL signal on line 56b of that machine is not asserted and multiplexer 28 passes, e.g., the non-inverted signal from amplifier 26. The machine then enters the LIT Fail State and waits for an incoming EOF waveform or a LIT pulse. In this operative State 1 in FIG. 4, the ENABLE signal on line 56a is not asserted, so that the MAU circuits 36 remain disabled.

If the workstation receives a valid frame of data, the frame's preamble 40a will be detected by the squelch circuit 38 and an SQ signal will be asserted at the output of that circuit, i.e., SQ=ON, so that the timers 82 and 84 in circuit 54 are disabled and that circuit is inactive. If now the circuit 52 detects an EOF waveform of an assumed polarity, say positive, during Stage 1, an EOF+ signal will be applied to state machine 56 and the circuit 44 will use that assumed polarity to perform a link integrity test to verify that polarity in the Link Test Fail: EOF State at Stage 2 in FIG. 4.

More particularly, as shown by the left hand branch of FIG. 4, state machine 56 begins a count of the number of EOF waveforms received with the same polarity as the initially detected EOF. If at least 2 EOF waveforms of the same polarity are detected, the state machine 56 will enter its LIT Pass State at operative Stage 3 in FIG. 4.

The LIT Pass State may also be reached by the detection of LIT pulses as shown by the right hand branch of FIG. 4. More particularly, if a LIT pulse of an assumed polarity, e.g., LIT+, is detected in Stage 1 of FIG. 4, the state machine enters the Link Test Fail: LIT State at Stage 2 to perform a link integrity test and to verify that polarity. Also, if while in the Link Test Fail: EOF State, a LIT pulse is received, the state machine may enter its Link Test Fail: LIT State directly from the left branch of FIG. 4. Similarly, if while in the Link Test Fail: LIT State, an EOF waveform is detected, the state machine may enter the Link Test Fail: EOF State described above.

For polarity verification of LIT pulses, the state machine counts incoming LIT pulses having the same polarity as the first LIT pulse. When the count reaches 8, the state machine enters its LIT Pass State at Stage 3 in FIG. 4. During this test, the successive LIT pulses must arrive within the timing window described above, i.e., no closer than LIT Min (2-7 ms) from the previous pulse and no further away than LIT Max (50-150 ms) from the previous pulse.

On the other hand, if in Stage 2, either an EOF waveform of the opposite polarity (EOF Pol.≠sense) or a LIT pulse of opposite polarity (LIT Pol.≠sense) is received at circuit 44, the SEL signal on state machine output line 56b is changed, which switches multiplexer 28 so that now the inverted signal from inverter 32 is applied to gate 34 which is still disabled at this stage of operation. The state machine also returns unconditionally to the LIT Fail State at Stage 1 of FIG. 4, clears or resets its internal LIT and EOF counters and begins a new test using the aforesaid opposite polarity detected by circuit 44.

Once a test criterion has been met, i.e., either EOF count=2 or LIT pulse count=8, and the state machine enters the LIT Pass State at Stage 3 in FIG. 4, i.e., Link Status is true (T), the ENABLE signal at the output of the state machine is asserted, thereby enabling gates 34 and 58 (FIG. 1) so that the data on the twisted pair 22 is passed to the MAU circuits 36 and those circuits are enabled so that they perform their normal communication functions.

While the state machine 56 is in its LIT Pass State at Stage 3 in FIG. 4, the workstation 12 functions normally until neither a LIT pulse nor an EOF waveform is received for the time LINK-Loss, i.e., Link-Loss Timer=DONE. When that timer does time out, the state machine 56 determines that the link integrity and polarity verification have failed and returns to Stage 1 to re-institute the link integrity test and polarity verification routine. In that event, the ENABLE signal from the state machine is de-asserted thereby disabling the gates 34 and 58 and the MAU circuits 36 in FIG. 1.

In an alternative embodiment, the workstation MAU will expect to receive an EOF waveform with a correct polarity or a LIT pulse with a correct polarity within a defined time window. In other words, the workstation functions normally as long as the circuit 44 receives EOF waveforms of the same polarity as the detected polarity or it receives LIT pulses having the same polarity as the detected polarity while the output of the squelch circuit 38 is de-asserted (SQ=OFF). However, if circuit 44 fails to receive a selected number of EOF waveforms with the correct polarity or a selected number of LIT pulses with the correct polarity while SQ=OFF within that timing window (LINK Loss Timer=DONE), the state machine 56 determines that the link integrity and polarity verification have failed and returns to Stage 1.

It will thus be seen that the objects set forth above, among those made apparent from the preceding description, are efficiently attained. Also, certain changes may be made in carrying out the above method and in the construction set forth without departing from the scope of the invention. For example, in some applications, the link integrity test and polarity verification may be performed using only LIT pulses or using only EOF waveforms or using some other distinctive component of a data packet. Also, the signal counts, durations and time windows described above have been chosed to be compatable with the 10 Base T standard. In other applications, different values may be appropriate. Therefore, it is intended that all matter contained in the above description or shown in the accompanying drawings shall be interpreted as illustrative and not at a limiting sense.

It is also to be understood that the following claims are intended to cover all of the generic and specific features of the invention described herein.

We claim:

1. A circuit for testing the link integrity and correcting the polarity of LAN link transmission media coupled to the MAU circuit of a LAN device that receives the transmission of data which includes link integrity test (LIT) pulses and frames including end of frame delimiter (EOF) waveforms, said circuit comprising sensing means receiving said transmission and sensing the polarity of a first EOF waveform and succeeding EOF waveforms and producing signals indicative of same;

counter means responsive to said signals for counting consecutive EOF waveforms having the same polarity as the first EOF waveform and providing an enabling signal when the count equals or exceeds a selected number;

means for producing a selection signal when an EOF waveform of the opposite polarity to said first EOF waveform is received by said sensing means and clearing said counter means in response thereto;

polarity switching means receiving said transmission and being responsive to said selection signal for inverting said transmission, and logic means receiving said transmission from said polarity switching means and being responsive to said enabling signal for passing said transmission.

2. The circuit defined in claim 1 wherein said transmission media is a twisted pair.

3. The circuit defined in claim 1 wherein said selected number is 2 or more.

4. The circuit defined in claim 1 and further including means for disabling said logic means and clearing said counter means when an EOF waveform of the opposite polarity is received by the sensing means after said transmission is passed by said logic means.

5. The circuit defined in claim 1 and further including second sensing means for sensing the polarity of a first LIT pulse and succeeding LIT pulses and producing second signals indicative of same;

second counter means responsive to said second signals for counting LIT pulses having the same polarity as the first LIT pulse and providing an enabling signal to said logic means when the count equals or exceeds a second selected number, and means for producing a selection signal when a LIT pulse of the opposite polarity to said first LIT pulse is received and clearing said counter means in response thereto.

6. The circuit defined in claim 5 and further including means for disabling the logic means and clearing said counter means and said second counter means if neither an EOF waveform nor a LIT pulse is received by said circuit for a selected time period after said transmission is passed by said logic means.

7. The circuit defined in claim 6 wherein said selected time period is 50 to 150 ms.

8. The circuit defined in claim 5 and further including means for disabling the logic means and clearing said second counter means if a LIT pulse of the opposite polarity is received by said second sensing means after said transmission is passed by said logic means.

9. A circuit for testing the link integrity and correcting the polarity of LAN link transmission media coupled to the MAU circuit of a LAN device that receives the transmission of data which includes link integrity test (LIT) pulses and frames including end of frame delimiter (EOF) waveforms, said circuit comprising sensing means receiving said transmission and sensing the polarity of a first LIT pulse and succeeding LIT pulses and producing signals indicative of same;

counter means responsive to said signals for counting consecutive LIT pulses having the same polarity as the first LIT pulse and providing an enabling signal when the count equals or exceeds a selected number;

means for producing a selection signal when a LIT pulse of the opposite polarity to said first LIT pulse is received by said sensing means and clearing said counter means in response thereto;

polarity switching means receiving said transmission and being responsive to said selection signal for inverting said transmission, and logic means receiving said transmission from said polarity switching means and being responsive to said enabling signal for passing said transmission.

10. The circuit defined in claim 9 wherein said transmission media is a twisted pair.

11. The circuit defined in claim 9 wherein said selected number is from 2 to 10.

12. The circuit defined in claim 9 wherein said selected number is 8 or more.

13. The circuit defined in claim 9 and further including means for disabling said logic means and clearing said counter means when a LIT pulse with the opposite polarity is received by said sensing means after said transmission is passed by the logic means.

14. The circuit defined in claim 9 wherein said counter means count as consecutive LIT pulses only those LIT pulses after the first LIT pulse that occur within a selected time window after the previous LIT pulse.

15. The circuit defined in claim 14 wherein the time window is between LIT Min=2-7 ms and LIT Max=25-150 ms.

16. The circuit defined in claim 15 wherein LIT Min is 2 ms and LIT max is 150 ms.

17. The circuit defined in claim 9 and further including means for disabling said logic means and clearing said counter means if a LIT pulse is not received by said circuit for a selected time period after said transmission is passed by said logic means.

18. A method of testing the link integrity and correcting the polarity of LAN link transmission media coupled to the MAU circuit of a LAN device that receives the transmission of data which includes link integrity test (LIT) pulses and frames including end of frame delimiter (EOF) waveforms, said method comprising the steps of sensing the polarity of a first EOF waveform and succeeding EOF waveforms in the received transmission and producing signals indicative of same;

in response to said signals, counting consecutive EOF waveforms having the same polarity as the first EOF waveform and providing an enabling signal when the count equals or exceeds a selected number;

producing a selection signal when an EOF waveform of the opposite polarity to said first EOF waveform is received by said sensing means and clearing said counter in response thereto;

inverting said received transmission in response to said selection signal, and passing said received transmission when said enable signal is present.

19. The circuit defined in claim 18 including the step of forming said transmission media as a twisted pair.

20. The method defined in claim 18 and including the additional step of de-asserting said enabling signal and clearing said count if an EOF waveform of the opposite polarity is received after said transmission is passed.

21. The method defined in claim 18 and including the additional steps of
   sensing the polarity of a first LIT pulse and succeeding LIT pulses in a received transmission and producing second signals indicative of same;
   in response to said second signals, counting consecutive LIT pulses having the same polarity as the first LIT pulse and providing an enabling signal to said logic means when the count equals or exceeds a selected second number, and
   producing a selection signal when a LIT pulse of the opposite polarity to said first LIT pulse is received and clearing said LIT pulse count in response thereto.

22. The method defined in claim 21 and including the additional step of de-asserting the enabling signal and clearing said counts if neither an EOF waveform nor a LIT pulse is received for a selected time period after said transmission is passed.

23. The method defined in claim 21 and including the additional step of de-asserting said enabling signal and clearing said counts if a LIT pulse of the opposite polarity is received after said transmission is passed.

24. A method of testing the link integrity and correcting the polarity of LAN link transmission media coupled to the MAU circuit of a LAN device that receives the transmission of data which includes link integrity test (LIT) pulses and frames including end of frame delimiter (EOF) waveforms, said method comprising the steps of
   sensing the polarity of a first LIT pulse and succeeding LIT pulses in the received transmission and producing signals indicative of same;
   in response to said signals, counting consecutive LIT pulses having the same polarity as the first LIT pulse and providing an enabling signal when the count equals or exceeds a selected number;
   producing a selection signal when a LIT pulse of the opposite polarity to said first LIT pulse is received by said sensing means and clearing said count in response thereto;
   inverting said received transmission in response to said selection signal, and
   passing said received transmission when said enabling signal is present.

25. The method defined in claim 24 including the step of forming the transmission media is a twisted pair.

26. The method defined in claim 24 and including the additional step of de-asserting said enabling signal and clearing said count when a LIT pulse with the opposite polarity is received after said transmission is passed.

27. The method defined in claim 24 wherein said LIT pulses after the first LIT pulse are counted only if they occur within a selected time window after the previous LIT pulse.

28. The method defined in claim 27 wherein the time window is selected to be between LIT Min=2-7 ms and LIT Max=25-150 ms.

29. A circuit for testing the link integrity and correcting the polarity of LAN link transmission media coupled to the MAU circuit of a LAN device that receives the transmission of data, said circuit comprising
   first sensing means for receiving said transmission and detecting the presence of positive waveforms of a pre-determined positive threshold voltage level and continuing for a pre-determined duration and producing first output signals in response thereto;
   second sensing means for receiving said transmission and detecting the presence of negative waveforms of a pre-determined negative threshold voltage level and continuing for a pre-determined duration and producing second negative signals in response thereto;
   counter means for counting said first and second output signals, said counter means providing an enabling signal when a selected number of consecutive first output signals or a selected number of consecutive second output signals is counted;
   means for resetting the counter means when the counting of said first output signals is interrupted by the occurrence of a second output signal or when the counting of said second output signals is interrupted by the occurrence of a first output signal and producing a selection signal in response thereto;
   polarity switching means receiving said transmission and being responsive to said selection signal for inverting said transmission;
   logic means receiving said transmission from said polarity switching means and being responsive to said enabling signal for passing said transmission.

30. The circuit defined in claim 29 and further including means for removing said enabling signal and resetting said counter means after the counter means has counted the selected number of one of said first and second output signals upon the occurrence of one of the other of said first and second output signals.

31. The circuit defined in claim 29 and further including means for removing said enabling signal and resetting said counter means if said output signals are absent for a selected time period.

32. The circuit defined in claim 31 wherein said selected time period is 50-150 ms.

33. The circuit defined in claim 29 wherein said counter means count as consecutive output signals only those output signals after the first output signal which occur within a selected time window after the previous output signal.

34. The circuit defined in claim 29 wherein
   said transmission includes data frames each of which has a preamble at the beginning of each frame which must consist of a defined sequence of pulses to be considered valid and an end of frame delimiter (EOF) waveform at the end of each frame, and
   said first and second sensing means detect the presence of waveforms consisting of positive and negative EOF waveforms, respectively.

35. The circuit defined in claim 34
   wherein said logic means also requires enablement by a squelch enable signal in order to pass said transmission, and
   further including a squelch circuit for receiving said transmission and detecting the presence in each frame preamble of said defined sequence of pulses and producing a squelch enable signal in response thereto which persists for the duration of said frame.

36. The circuit defined in claim 35 wherein said selected number is 2 or more.

37. The circuit defined in claim 35 wherein said positive and said negative waveforms have pre-determined durations of about 160 ns.

38. The circuit defined in claim 29 wherein said transmission includes spaced-apart data frames and link integrity test (LIT) pulses between said frames, and said first and second sensing means detect the presence of waveforms consisting of positive and negative LIT pulses, respectively.

39. The circuit defined in claim 38 wherein said counter means count as consecutive output signals only those output signals after the first output signal which occur within a selected time window LIT Min=2-10 ms and LIT Max=25-150 ms after the previous output signal.

40. The circuit defined in claim 38 wherein said selected number is from 2 to 10.

41. The circuit defined in claim 38 wherein said positive and negative waveforms have pre-determined durations of about 100 ns.

42. The circuit defined in claim 38 and further including
a squelch circuit for receiving said transmission and recognizing said waveforms as valid LIT pulses if said waveforms are within a selected time-acceptance window and producing a qualification signal in response thereto, and
means for preventing the counting of said LIT pulses in the absence of said qualification signal.

43. A method of testing the link integrity and correcting the polarity of LAN link transmission media coupled to the MAU circuit of a LAN device that receives the transmission of data, said method comprising
sensing the presence of positive waveforms of a pre-determined positive threshold voltage level and continuing for a pre-determined duration and producing first output signals in response thereto;
sensing the presence of negative waveforms of a pre-determined negative threshold voltage level and continuing for a pre-determined duration and producing second output signals in response thereto;
counting said first and second output signals to provide an enabling signal when a selected number of consecutive first output signals or a selected number of consecutive second output signals is counted;
when the counting of said first output signals is interrupted by the occurrence of a second output signal or when the counting of said second output signal is interrupted by the occurrence of a first output signal, producing a selection signal in response thereto and resetting the count;
inverting the received transmission in response to the selection signal, and
passing the received transmission when said enabling signal is present.

44. The method defined in claim 43 and including the step of removing said enabling signal and resetting the count after the counting of the selected number of one of said first and second output signals upon the occurrence of one of the other of said first and second output signals.

45. The method defined in claim 43 and including the step of removing said enabling signal and resetting the count if said output signals are absent for a selected time period.

46. A circuit for testing the link integrity and correcting the polarity of LAN link transmission media coupled to the MAU circuit of a LAN device that receives the transmission of data which includes link integrity test (LIT) pulses and frames including end of frame delimiter (EOF) waveforms, said circuit comprising
first sensing means receiving said transmission and sensing the polarity of a first EOF waveform and succeeding EOF waveforms and producing signals indicative of same;
first counter means responsive to said signals for counting consecutive EOF waveforms having the same polarity as the first EOF waveform and providing an enabling signal when the count equals or exceeds a first selected number;
second sensing means receiving said transmission and sensing the polarity of a first LIT pulse and succeeding LIT pulses and producing signals indicative of same;
second counter means responsive to said signals for counting consecutive LIT pulses having the same polarity as the first LIT pulse and providing an enabling signals when the count equals or exceeds a second selected number;
means for producing a selection signal when an EOF waveform of the opposite polarity to said first EOF waveform or a LIT pulse of the opposite polarity to said first LIT pulse is received by said sensing means and clearing said counter means in response thereto;
polarity switching means receiving said transmission and being responsive to said selection signal for inverting said transmission, and
logic means receiving said transmission from said polarity switching means and being responsive to said enabling signal for passing said transmission.

47. The circuit defined in claim 46 wherein
said transmission media is a twisted pair;
said first selected number is 2 or more, and
said second selected number is 2-10.

48. The circuit defined in claim 46 and further including means for disabling the logic means and clearing said first counter means and said second counter means if neither an EOF waveform nor a LIT pulse is received by said circuit for a selected time period after said transmission is passed by said logic means.

49. The circuit defined in claim 48 wherein said selected time period is 50 to 150 ms.

50. The circuit defined in claim 46 wherein said counter means count as consecutive LIT pulses only those LIT pulses after the first LIT pulse that occur within a selected time window after the previous LIT pulse.

51. The circuit defined in claim 50 wherein the time window is between LIT Min=2-7 ms and LIT Max=25-150 ms.

52. A method of testing the link integrity and correcting the polarity of LAN link transmission media coupled to the MAU circuit of a LAN device that receives the transmission of data which includes link integrity test (LIT) pulses and frames including end of frame delimiter (EOF) waveforms, said method comprising the steps of
sensing the polarity of a first EOF waveform and succeeding EOF waveforms in the received transmission and producing first signals indicative of same;
in response to said first signals, counting consecutive EOF waveforms having the same polarity as the fist EOF waveform and providing an enabling signal when the count equals or exceeds a first selected number;

sensing the polarity of a first LIT pulse and succeeding LIT pulses in the received transmission and producing second signals indicative of same;

in response to said second signals, counting consecutive LIT pulses having the same polarity as the first LIT pulse and providing an enabling signal when the count equals or exceeds a second selected number;

producing a selection signal when an EOF waveform of the opposite polarity to the first EOF waveform or a LIT pulse of the opposite polarity to said first LIT pulse is received by said sensing means and clearing said count in response thereto;

inverting said received transmission in response to said selection signal, and passing said received transmission when said enabling signal is present.

53. The method defined in claim 52 including the step of forming the transmission media is a twisted pair.

54. The method defined in claim 53 and including the additional step of de-asserting said enabling signal and clearing said count when an EOF waveform of the opposite polarity or a LIT pulse with the opposite polarity is received after said transmission is passed.

55. The method defined in claim 53 wherein said LIT pulses after the first LIT pulse are counted only if they occur within a selected time window after the previous LIT pulse.

56. The method defined in claim 55 wherein the time window is selected to be between LIT Min=2-7 ms and LIT Max=25-150 ms.

* * * * *